(12) United States Patent
Zhao et al.

(10) Patent No.: US 8,438,781 B2
(45) Date of Patent: May 14, 2013

(54) VERTICAL PLANTING MODULE

(76) Inventors: Feiyun Zhao, Nanjing (CN); Lin Zhao, Toronto (CA)

( * ) Notice: Subject to any disclaimer, the term of this patent is extended or adjusted under 35 U.S.C. 154(b) by 258 days.

(21) Appl. No.: 13/121,984

(22) PCT Filed: Mar. 1, 2010

(86) PCT No.: PCT/CN2010/000246
§ 371 (c)(1),
(2), (4) Date: May 3, 2011

(87) PCT Pub. No.: WO2010/105495
PCT Pub. Date: Sep. 23, 2010

(65) Prior Publication Data
US 2011/0197506 A1   Aug. 18, 2011

(30) Foreign Application Priority Data
Mar. 17, 2009   (CN) .......................... 2009 1 0026012

(51) Int. Cl.
*A01G 9/02* (2006.01)
(52) U.S. Cl.
USPC .......................... 47/82; 47/83; 47/85
(58) Field of Classification Search .................. 47/59 R, 47/59 S, 60, 61, 62 R, 62 A, 62 C, 62 N, 47/63, 79, 82, 65.5, 65.7, 66.1, 66.5, 66.6, 47/66.7, 67, 83, 85, 86
See application file for complete search history.

(56) References Cited

U.S. PATENT DOCUMENTS

| | | | | |
|---|---|---|---|---|
| 2,279,735 A | * | 4/1942 | Gates | 47/33 |
| 5,099,606 A | * | 3/1992 | Koerper | 47/66.1 |
| 5,373,662 A | * | 12/1994 | Wickstrom | 47/82 |
| 6,725,601 B2 | * | 4/2004 | Chick | 47/83 |
| 7,788,848 B1 | * | 9/2010 | Koumoudis | 47/65.9 |
| 7,921,599 B2 | * | 4/2011 | Irwin | 47/66.1 |
| 2005/0055879 A1 | * | 3/2005 | Darlington | 47/62 R |
| 2008/0110086 A1 | * | 5/2008 | Julia | 47/64 |
| 2008/0295402 A1 | * | 12/2008 | Bindschedler et al. | 47/83 |
| 2009/0223126 A1 | * | 9/2009 | Garner et al. | 47/66.7 |
| 2010/0083571 A1 | * | 4/2010 | Irwin | 47/66.5 |
| 2011/0088319 A1 | * | 4/2011 | Koumoudis | 47/66.6 |
| 2011/0094153 A1 | * | 4/2011 | Urriola | 47/65.7 |
| 2011/0146147 A1 | * | 6/2011 | Irwin | 47/66.5 |
| 2011/0192084 A1 | * | 8/2011 | MacKenzie | 47/83 |

(Continued)

FOREIGN PATENT DOCUMENTS

CN   101268745 A   9/2008

*Primary Examiner* — T. Nguyen
(74) *Attorney, Agent, or Firm* — Madrone Associates Inc

(57) ABSTRACT

The invention includes a box, vertical and horizontal dividers, a plant-growth mat, and a mounting bar. The dividers are permanently linked to form an insert, which slides into insert grooves inside the box. Insert grooves have upper and lower rails. At the insert groove openings rail ends feature upward bends. The plant-growth mat is secured against the box innerback by the insert which is prevented from sliding out by the upward bends of the lower rails. A support mount and a fastener on the back of the box and compatible groove surfaces on the mounting bar prevent box movement when mounted. The invention increases the rigidity of the dividers and reduces their deformability. It facilitates inserting the integrated dividers into the box with convenient insert grooves. The plant-growth mat can store water, prevent soil erosion, and provide aeration to plant roots. The mounting bar stabilizes the module for easy installation.

14 Claims, 6 Drawing Sheets

U.S. PATENT DOCUMENTS

2011/0219689 A1* 9/2011 Hodson-Walker ............. 47/66.6
2011/0258925 A1* 10/2011 Baker ............................ 47/65.8
2012/0017506 A1* 1/2012 Zhao et al. ........................ 47/82
2012/0227320 A1* 9/2012 Dos Santos ....................... 47/79

* cited by examiner

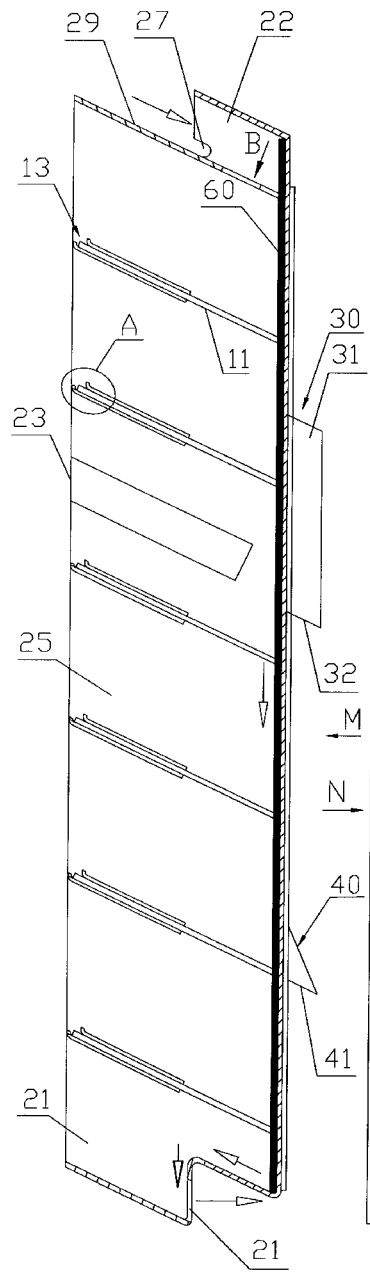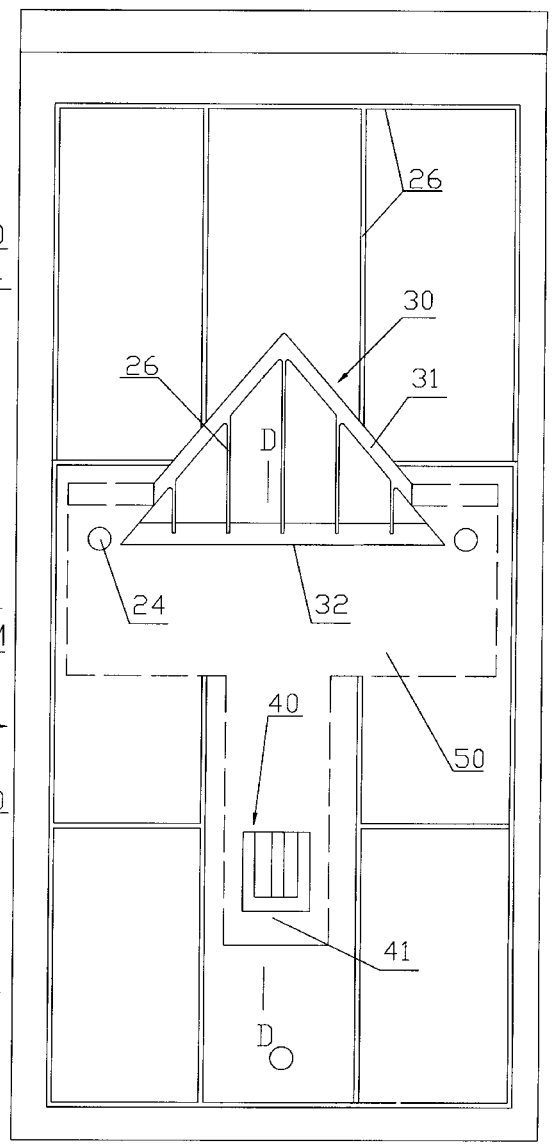
FIG.4
FIG.5

VERTICAL PLANTING MODULE

This application is the National Stage of International Application No. PCT/CN2010/000246, filed 1 Mar. 2010.

FIELD OF THE INVENTION

The present invention relates to devices relevant to landscaping and horticulture, more particularly to a vertical planting module for planting on walls.

BACKGROUND OF THE INVENTION

Along with the growth of our country's economic power and the improvement in people's living standards, the attention paid to the environment is increasing. People now care more about the landscaping and horticulture in their surrounding environment, not only in the ground with flowers, grasses, trees, and lawns but also not uncommonly on vertical surfaces like walls.

At present planting on walls is commonly realized by a set of modules installed on walls. Chinese Patent publication number CN101268745 publishes a modular assembly for vertical planting, wherein a box consists of a back board for wall hanging, vertical side frames, a top divider, a bottom divider, a top frame, and a bottom frame, and wherein vertical dividers and horizontal dividers divide the interior of the box into multiple nursing cells. On a back of the box is a horizontal hanging groove, whereby the assembly is installed onto a wall. In use, the modular assembly exhibits the following drawbacks:

1. Multiple unlinked horizontal dividers and vertical dividers must be assembled separately, and then interconnected together, which is not efficient. Furthermore, unlinked dividers have poor rigidity and after a period of time may exhibit varying degrees of deformation, mainly warping, so that the dividers cannot slide into insert grooves smoothly or not at all, thus an entire module may be rendered useless and its lifespan is greatly reduced.

2. Soil in nursing cells may flow out with water inflow from water inlets, causing soil erosion, making it not possible for plants to firmly root in the soil, and thus not benefiting plant growth.

3. Nursing cells inside a module cannot be selectively combined according to the need by plant species, greatly limiting the plant species that can be planted inside a module.

4. With the sole dependence on a positioning support surface of a horizontal hanging groove for positioning onto a wall, an entire device is not stable enough during positioning and is prone to deformation.

5. A dripping hose is put inside a water inlet, with no way of being fixed, and often moves erratically, making it not possible to properly align emitters with the water inlet and causing uneven water inflow for each nursing cell.

SUMMARY OF THE INVENTION

The purpose of the present invention is to overcome the inadequacies in the existing technology as described above, providing a vertical planting module, to be realized in accordance with the technical design as described below:

The module comprises a box, configured with a water inlet on a top of the box and with drainage outlets in a bottom of the box, and horizontal dividers and vertical dividers that divide the box into multiple nursing cells, and further comprises a plant-growth mat and a mounting bar. Furthermore an insert is formed of at least one vertical divider that permanently links multiple horizontal dividers parallel to each other with a certain distance in between and at a tilted position, and the insert slides into the box via insert grooves configured on side walls inside the box. The insert grooves are structured of upper and lower rails placed at corresponding positions on the side walls inside the box. Ends of the rails that form openings of insert grooves feature upward bends. The plant-growth mat is secured against an inner-back of the box by the insert which is prevented from sliding out by the upward bends at ends of lower rails. On a back of the box are configured a support mount and a fastener, where the support mount is configured with a support surface and a positioning surface and where the fastener is configured with a fastening surface. At a left side and a right side on top of the box are configured respectively locking grooves for locking a dripping hose. The mounting bar is configured with groove surfaces compatible with the support surface, the positioning surface and the fastening surface on the box. The box and the insert placed wherein, via the support surface, the positioning surface and the fastening surface compatible with the corresponding groove surfaces on the mounting bar, do not allow free movement of the module when it is mounted on the mounting bar.

A further improvement of the present invention is that multiple inserts may be inserted into the box, where an interior of the box is divided into nursing cells of different volumes by combinations of multiple inserts.

A still further improvement of the present invention is that T-shaped groove openings for water inflow are configured on the inside of a top board of the box.

A still further improvement of the present invention is that the plant-growth mat is made by compressing hemp fibers or chemical fibers or a mixture of both.

A still further improvement of the present invention is that locking grooves have a trapezoidal shape.

A still further improvement of the present invention is that water impeding grooves are configured on the inner-back of the box.

A still further improvement of the present invention is that the water impeding grooves are centered on nursing cells.

Water passageways are configured between water impeding grooves for nursing cells at the same height.

The present invention permanently links into a whole the horizontal and vertical dividers that divide the interior of the box, thus improving the rigidity of the dividers, and through a period of experimental use, demonstrating a major reduction in deformability as compared to unlinked dividers. Furthermore, the invention turns dividers into an integrated insert, and adopts a bending structure at ends of corresponding insert grooves, thus facilitating sliding of the insert into the interior of the box. The plant-growth mat placed in between the insert and the inner-back of the box can prevent soil erosion due to water flow, performs the functions of storing water and basically evenly distributing water to nursing cells, and also provides an aeration layer for plant roots. The present invention configures U-shaped grooves for locking a dripping hose on top of the box, guaranteeing proper alignment of emitters with the position of each nursing cell, and making possible even distribution of water inside a module. The present invention also configures a mounting bar for proper positioning of a module onto a wall, and a support mount and a fastener compatible with the mounting bar on the back of the box, preventing the free movement of the module when it is being installed on the mounting bar, stabilizing the positioning, maximizing the load and making it easier to install. Furthermore, the support mount on the back of the box helps prevent the box from deformation. According to the water storing function of the plant-growth mat, the present invention also configures openings of water inlet grooves as T-shaped to alter the cross-section of water inflow, directing a large portion of the water inflow to the plant-growth mat for even distribution of water into nursing cells at multiple layers, and dripping a small portion of the water to nursing cells below, thus achieving the purpose of evenly distributing water.

DESCRIPTION OF DRAWINGS

FIG. 4 is a sectional view at M of a structure of the present invention as shown in FIG. 1.
FIG. 5 is a sectional view at N of a structure of the present invention as shown in FIG. 1 (i.e. a rear view).

LIST OF REFERENCE SYMBOLS

10 an insert; 11 horizontal dividers; 11a outer slits; 11b inner slits; 12 a vertical divider; 13 insert grooves; 14 upper rails; 15 lower rails; 19 left and right sides; 20 a box; 20a an inner-back of the box; 20b water impeding grooves; 20c water passageways; 21 drainage outlets; 22 a water inlet; 23 rectangular grooves; 24 fixed holes; 25 nursing cells; 26 reinforcing bars; 27 locking grooves; 28 T-shaped groove openings; 29 a top board; 30 a support mount; 31 a positioning surface; 32 a support surface; 40 a fastener; 41 a fastening surface; 50 a mounting bar; 51, 52, 53 groove surfaces; and 60 a plant-growth mat.

DETAILED DESCRIPTION

Figure 1:
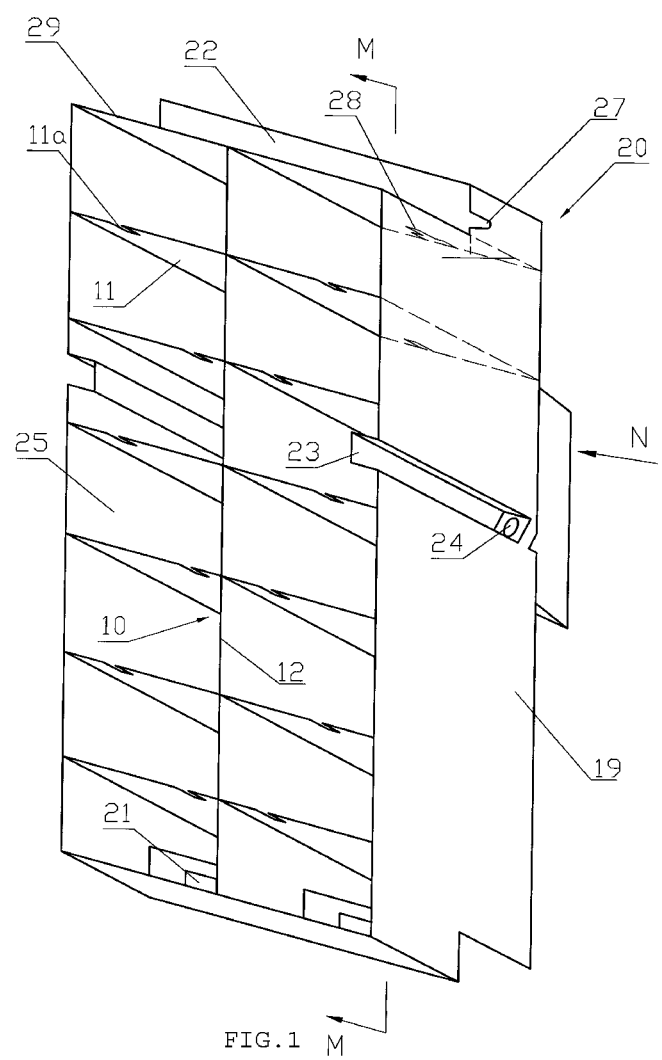
FIG. 1 is a depiction of a structure of the present invention.

Referring to FIG. 1, a planting module of the present invention mainly consists of a box 20, an insert 10, a plant-growth mat 60, and a mounting bar 50. The box is configured with a water inlet 22 on top of the box, with drainage outlets 21 in a bottom of the box, and with symmetrical rectangular grooves 23 on two sides of the box. Fixed holes 24 are configured in bottoms of the rectangular grooves, for screws to go through and secure the planting module onto a wall. Rectangular grooves 23 provide operating space for forward and reverse screwing.

An interior of the box 20 is divided into fourteen nursing cells 25 by the insert 10 which is formed of a vertical divider 12 and horizontal dividers 11. At left and right sides 19 on top of the box 20 are configured respectively trapezoidal locking grooves 27 for locking a dripping hose, providing stabilization for the position of the dripping hose and emitters, and aligning emitters on the dripping hose with the water inlet 22.

Figure 2:
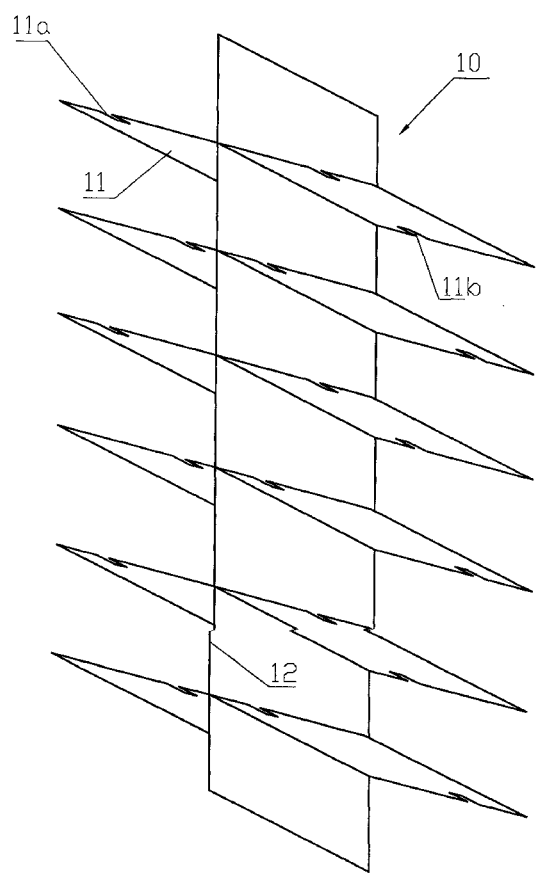
FIG. 2 is a depiction of an insert structure.

Referring to FIG. 2, the insert 10 is formed of a vertical divider that permanently links six parallel horizontal dividers with a certain distance in between and at a tilted position. Thus dividers that otherwise need separate assembly are linked into a whole, increasing rigidity of the dividers, reducing multiple insertions of separate parts to one insertion, and facilitating insertion of parts. Furthermore in front and back of each horizontal divider are configured respectively outer slits 11a and inner slits 11b, which are staggered between adjacent horizontal dividers above and below. The inner slits can prevent a buildup of excessive water and provide even distribution of water. The outer slits provide drainage when there is too much rainwater in a rainy period, preventing an excess of water from washing away the growth medium inside nursing cells and causing a loss thereof.

Figure 3:
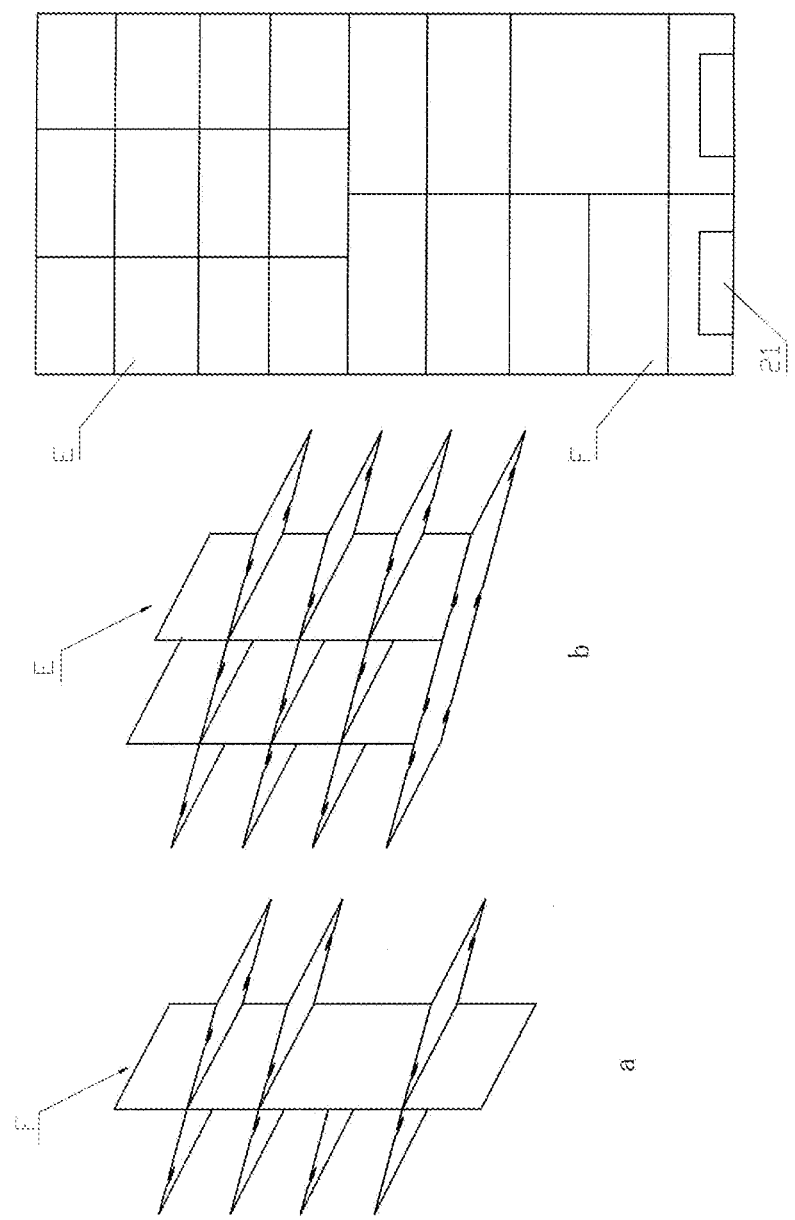
FIG. 3 is a depiction of different insert structures.

The insert of the present invention may have alternative structures. As shown in FIG. 3, multiple inserts may be inserted into an interior of the box, dividing the interior of the box into nursing cells of different volumes via combinations of multiple inserts. For example an insert F as shown in FIG. 3a and an insert E as shown in FIG. 3b are inserted into the box to form a module as shown in FIG. 3c.

Figure 6:
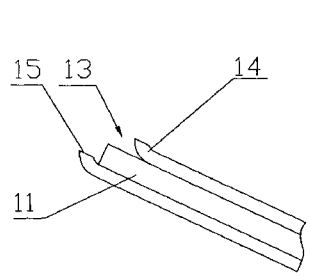
FIG. 6 is an enlarged view at A of a sectional view at M of a structure of the present invention as shown in FIG. 4.

Referring to FIG. 4, the insert 10 slides into the box via insert grooves 13 configured on side walls inside the box. Insert grooves 13 are structured of upper rails 14 and lower rails 15 configured at corresponding positions on the side walls inside the box, as shown in FIG. 6, and feature upward bends at ends of the rails that form openings of insert grooves, thus facilitating smooth sliding of horizontal dividers 11 on the insert 10 into the grooves. A plant-growth mat 60 is secured against the inner-back of the box by the insert 10. The upward bends at ends of the lower rails 15 can effectively prevent the insert 10 from sliding out due to reasons such as vibration, and guarantee that the insert 10 always keep the plant-growth mat 60 secured against the inner-back of the box.

Figure 7:
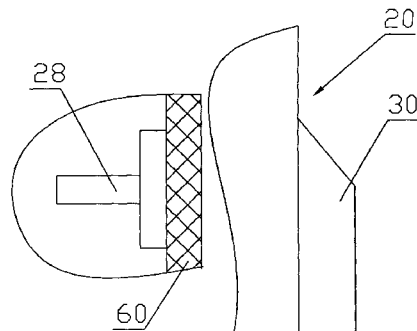
FIG. 7 is a sectional view at B of a structure of the present invention as shown in FIG. 4.

Referring to FIG. 7, on an inner side (i.e. on the side next to the plant-growth mat) of a top board 29 of the box are configured T-shaped groove openings 28 for water inflow, wherethrough a small portion of the water inflow from the water inlet 22 drips to nursing cells below, while a large portion of the water flows to the plant-growth mat 60. Thus the altering of the cross-section of water inflow at the T-shaped groove openings facilitates appropriate water distribution for storing of sufficient water in the plant-growth mat, and in turn for evenly distributing water to individual nursing cells by the plant-growth mat.

The use of the plant-growth mat 60 helps plants to firmly grow roots, provides adjustment to water storage capacity, and provides an aeration layer for plant roots. In this embodiment, plant-growth mats are made by compressing hemp fibers, while they can also be made by compressing chemical fibers, e.g., polyester fibers, polypropylene fibers, etc. Still plant-growth mats can be made by compressing a mixture of hemp fibers and chemical fibers. In general materials for plant-growth mats are selected according to particular regions and projects.

Referring to FIG. 4 and FIG. 5, a triangular support mount 30 and a fastener 40 are configured respectively on an upper part and a lower part of the back of the box 20. The support mount 30 is configured with a support surface 32 and a positioning surface 31, while the fastener 40 is configured with a fastening surface 41.

Figure 8:
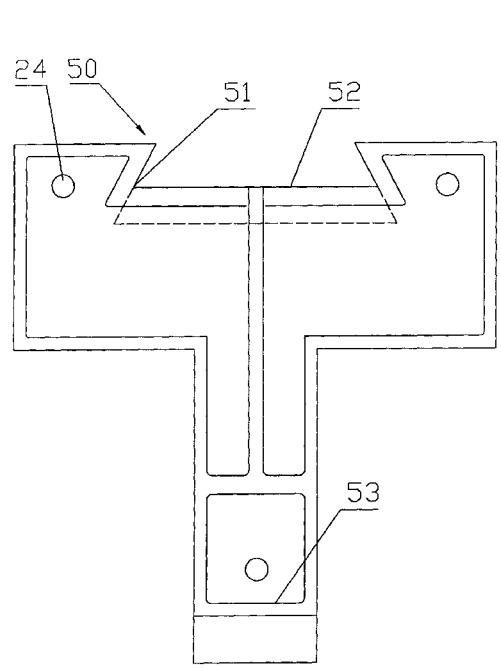
FIG. 8 is a depiction of a structure of the mounting bar on its side facing the box.

Referring to FIG. 8, the mounting bar 50 is configured with groove surfaces 52, 51 and 53 that correspond to the support surface 32, the positioning surface 31, and the fastening surface 41 on the box 20. Among them, the groove surface 52 and its flanking groove surfaces 51 are configured on an upper part of the mounting bar 50, forming a dovetail structure, while the groove surface 53 is configured on a lower part of the mounting bar 50. The groove surfaces 52 and 53 are tilted at the same angle, and may also be positioned as two parallel planes.

Figure 9:
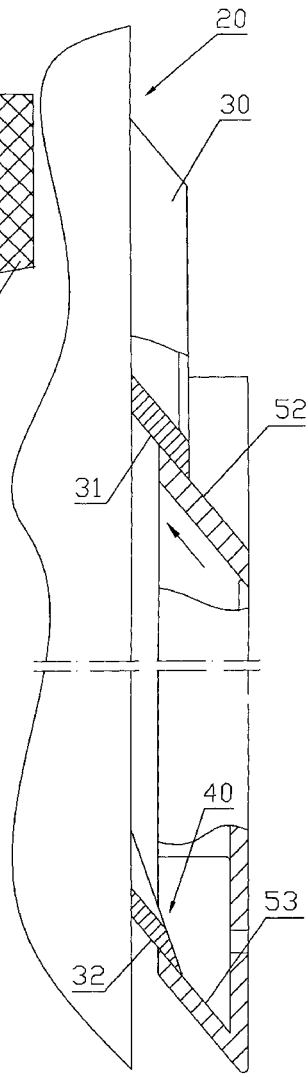
FIG. 9 is a sectional view at D-D in a depiction of a structure of the present invention as shown in FIG. 5 during the process of mounting the box onto the mounting bar.

Referring to FIG. 9, the box 20 (and the insert 10 placed wherein) is supported on the groove surface 52 of the mounting bar 50 via the support surface 32 of the support mount 30, while two groove surfaces 51 limit the free movement of the box 20 in left-right and up-down directions, not allowing free movement of the box mounted on the mounting bar. The mounting bar 50 and the box 20 are tightly locked by fastening the groove surface 53 with the fastening surface 41, such that the module can be accurately positioned with the mounting bar for stabilization and easy installation.

Figure 10:
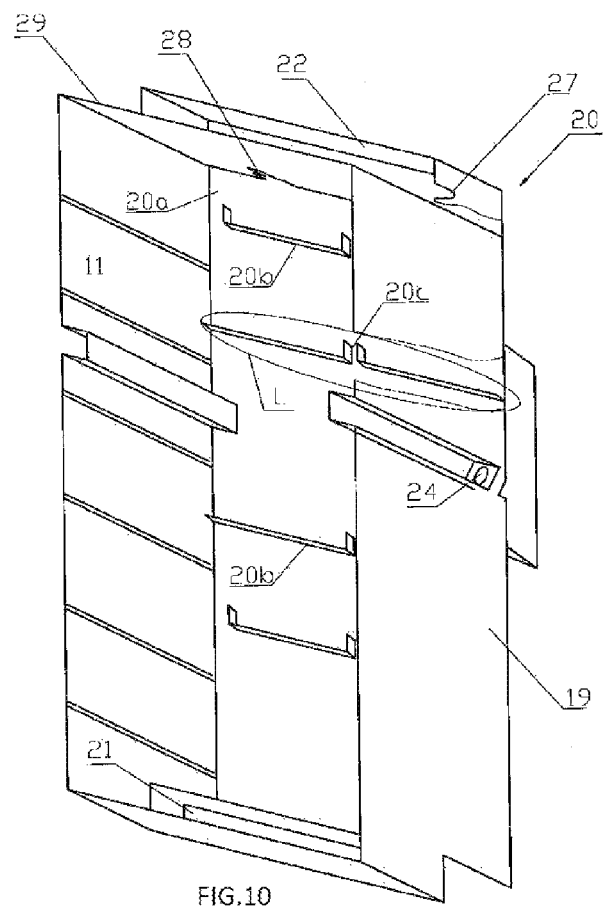
FIG. 10 is a depiction of a structure of the box.
Figure 11:
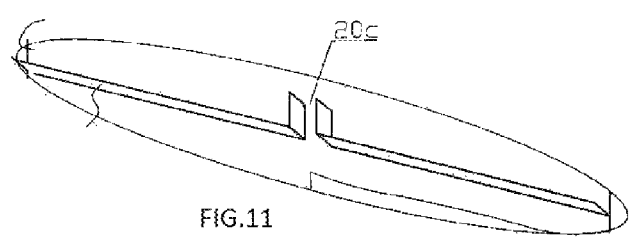
FIG. 11 is an enlarged view at location L of the box.

Referring to FIG. 10 and FIG. 11, on an inner-back 20a of the box, the present invention may also configure water impeding grooves 20b that intercept the downward water flow. The present embodiment, at four heights on the inner-back 20a, configures eight water impeding grooves 20b in pairs. For optimal location the water impeding grooves are centered on nursing cells. Between nursing cells at the same height are configured water passageways 20c.

The planting module of the present invention also utilizes a structure of reinforcing bars 26 (referring to FIG. 5) to increase strength, and is manufactured with environment-friendly materials that are non-toxic, harmless and recyclable, such as recyclable high-density polyethylene.

For planting on walls, place and interconnect multiple planting modules at their upper and lower edges, and install appropriate irrigation systems for smooth water flow. Deposit a proper amount of growth medium into each nursing cell 25, and plant plants in the growth medium. Water for the plants flows in from the water inlet 22 on top of the box via emitters on the dripping hose, flows down along the plant-growth mat 60 and the inner-back of the box and layers of growth medium, and flows out of drainage outlets 21, as indicated in the directions shown by the hollow arrows in FIG. 4.

Part of the downward water flow is intercepted and stored by water impeding grooves 20b, thus the water flow is reduced and slowed down, while water passageways 20c guarantee that the rest of the water can flow out therethrough.

We claim:

1. A vertical planting module comprising:
   a box having a water inlet on a top of the box and drainage outlets in a bottom of the box;
   an insert formed of at least one vertical divider linking multiple horizontal dividers parallel to each other with a certain distance in between and at a tilted position, wherein the horizontal dividers and vertical dividers divide the box into multiple nursing cells;
   insert grooves structured of upper rails and lower rails placed at corresponding positions on side walls inside the box, wherein ends of the upper and lower rails that form openings of the insert grooves have upward bends, and the insert slides into the box via the insert grooves;
   a plant-growth mat secured against an inner-back of the box by the insert which is prevented from sliding out by the upward bends of the lower rails;
   a support mount and a fastener located on a back of the box, wherein the support mount has a support surface and a positioning surface and the fastener has a fastening surface;
   locking grooves configured respectively for locking a dripping hose at a left side and a right side on the top of the box; and
   a mounting bar configured with groove surfaces matching the support surface, the positioning surface and the fastening surface on the box, such that the box including the insert placed therein is not allowed free movement when mounted on the mounting bar, by the support surface, the positioning surface and the fastening surface matching the corresponding groove surfaces on the mounting bar.

2. The vertical planting module of claim 1, wherein multiple inserts may be inserted into the box, where an interior of the box is divided into nursing cells of different volumes by combinations of multiple inserts.

3. The vertical planting module of claim 1, wherein T-shaped groove openings for water inflow are configured on an inner side of a top board of the box.

4. The vertical planting module of claim 3, wherein the plant-growth mat is made by compressing hemp fibers or chemical fibers or a mixture of both.

5. The vertical planting module of claim 4, wherein the locking grooves have a trapezoidal shape.

6. The vertical planting module of claim 5, wherein water impeding grooves are configured on the inner-back of the box.

7. The vertical planting module of claim 6, wherein water impeding grooves are centered on nursing cells.

8. The vertical planting module of claim 7, wherein water passageways are configured between water impeding grooves for multiple nursing cells at the same height.

9. The vertical planting module of claim 2, wherein T-shaped groove openings for water inflow are configured on an inner side of a top board of the box.

10. The vertical planting module of claim 9, wherein the plant-growth mat is made by compressing hemp fibers or chemical fibers or a mixture of both.

11. The vertical planting module of claim 10, wherein the locking grooves have a trapezoidal shape.

12. The vertical planting module of claim 11, wherein water impeding grooves are configured on the inner-back of the box.

13. The vertical planting module of claim 12, wherein water impeding grooves are centered on nursing cells.

14. The vertical planting module of claim 13, wherein water passageways are configured between water impeding grooves for multiple nursing cells at the same height.

* * * * *